United States Patent
Deng et al.

(10) Patent No.: US 11,110,883 B1
(45) Date of Patent: Sep. 7, 2021

(54) AIRBAG ASSEMBLY INCLUDING A VENT COVER

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/923,195

(22) Filed: Jul. 8, 2020

(51) Int. Cl.
*B60R 21/2338* (2011.01)
*B60R 21/207* (2006.01)
*B60R 21/237* (2006.01)
*B60R 21/239* (2006.01)
*B60R 21/264* (2006.01)
*B60R 21/231* (2011.01)

(52) U.S. Cl.
CPC ........ *B60R 21/2338* (2013.01); *B60R 21/207* (2013.01); *B60R 21/237* (2013.01); *B60R 21/239* (2013.01); *B60R 21/264* (2013.01); *B60R 21/23138* (2013.01); *B60R 2021/2395* (2013.01); *B60R 2021/23146* (2013.01); *B60R 2021/23384* (2013.01)

(58) Field of Classification Search
None
See application file for complete search history.

(56) References Cited

U.S. PATENT DOCUMENTS

| | | | |
|---|---|---|---|
| 7,445,237 B2 | 11/2008 | Boyle, III et al. | |
| 7,874,583 B2 | 1/2011 | Sahm et al. | |
| 7,931,299 B2 | 4/2011 | McFadden et al. | |
| 8,020,889 B2 | 9/2011 | Bauer et al. | |
| 8,500,163 B2 | 8/2013 | Mallinger et al. | |
| 9,682,681 B1* | 6/2017 | Patel ................ | B60R 21/01512 |
| 10,099,645 B2* | 10/2018 | Song ................... | B60R 21/207 |
| 10,300,878 B2* | 5/2019 | Park ................... | B60R 21/2171 |
| 10,821,928 B2* | 11/2020 | Deng ............... | B60R 21/01554 |
| 10,981,533 B2* | 4/2021 | Kobayashi ....... | B60R 21/23138 |
| 2008/0079250 A1 | 4/2008 | Boyle et al. | |
| 2019/0092270 A1* | 3/2019 | Song ................... | B60R 21/2338 |
| 2020/0282945 A1* | 9/2020 | McKeon .............. | B60R 21/214 |
| 2021/0094499 A1* | 4/2021 | Deng .................. | B60R 21/264 |

FOREIGN PATENT DOCUMENTS

| | | | | |
|---|---|---|---|---|
| JP | 2020114687 A * | 7/2020 | .......... | B60R 21/207 |
| WO | 2017057850 A1 | 4/2017 | | |
| WO | WO-2020217859 A1 * | 10/2020 | .......... | B60R 21/207 |

* cited by examiner

*Primary Examiner* — Faye M Fleming
(74) *Attorney, Agent, or Firm* — Frank A. MacKenzie; Bejin Bieneman PLC (57) ABSTRACT

An assembly includes an airbag having a fold releasable to a released position. The airbag has a vent. The assembly has a vent cover slidably supported by the airbag and slidable relative to the vent. The assembly has a first tether having an end connected to the fold and another end connected to the airbag. The assembly has a second tether connected to the fold and to the vent cover.

16 Claims, 8 Drawing Sheets

AIRBAG ASSEMBLY INCLUDING A VENT COVER

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An assembly includes an airbag having a fold releasable to a released position. The airbag includes a vent. The assembly includes a vent cover slidably supported by the airbag and slidable relative to the vent. The assembly includes a first tether having an end connected to the fold and another end releasably anchored to the airbag. The assembly includes a second tether connected to the fold and to the vent cover.

The assembly may include a pyrotechnic device, the first tether releasable by the pyrotechnic device.

The vent cover may include a hole in communication with the vent.

The vent cover may be slidable relative to the airbag along an axis, and the hole may be elongated along the axis and varies in width perpendicular to the axis.

The vent cover may be slidable along the axis in a first direction as the fold moves toward the released position, the width of the hole may increase along the first direction.

The vent cover may be slidable relative to the airbag along an axis when the fold moves from an unreleased position to the released position, and the hole may have a first width in communication with the vent when the fold is in the unreleased position and a second width in communication with the vent when the fold is in the released position, the second width being less than the first width.

The vent may have a width, the second width of the hole being smaller than the width of the vent, the first width being larger than the width of the vent.

The airbag may include an inflation chamber and the vent cover, the first tether, and the second tether are in the inflation chamber.

The assembly may include a guide fixed to the airbag, the vent cover being slidably engaged with the guide.

The vent cover may be disposed between the guide and the airbag.

The vent cover may include a catch designed to engage the guide when the fold is in the released position.

The vent cover may be slidable relative to the airbag along an axis when the fold moves from an unreleased position to the released position, the vent cover may include a hole having a first width in communication with the vent when the fold is in the unreleased position and a second width in communication with the vent when the fold is in the released position, the second width being less than the first width.

The vent cover may include a distal end distal to the fold, the guide may be between the distal end and the fold, and the catch is at the distal end of the vent cover.

The vent cover may be releasably fixed to the guide.

The airbag may have a top and a bottom and the fold may be at the top of the airbag.

The assembly may include a seat including a seatback, the airbag may be supported by the seatback.

Figure 2A:
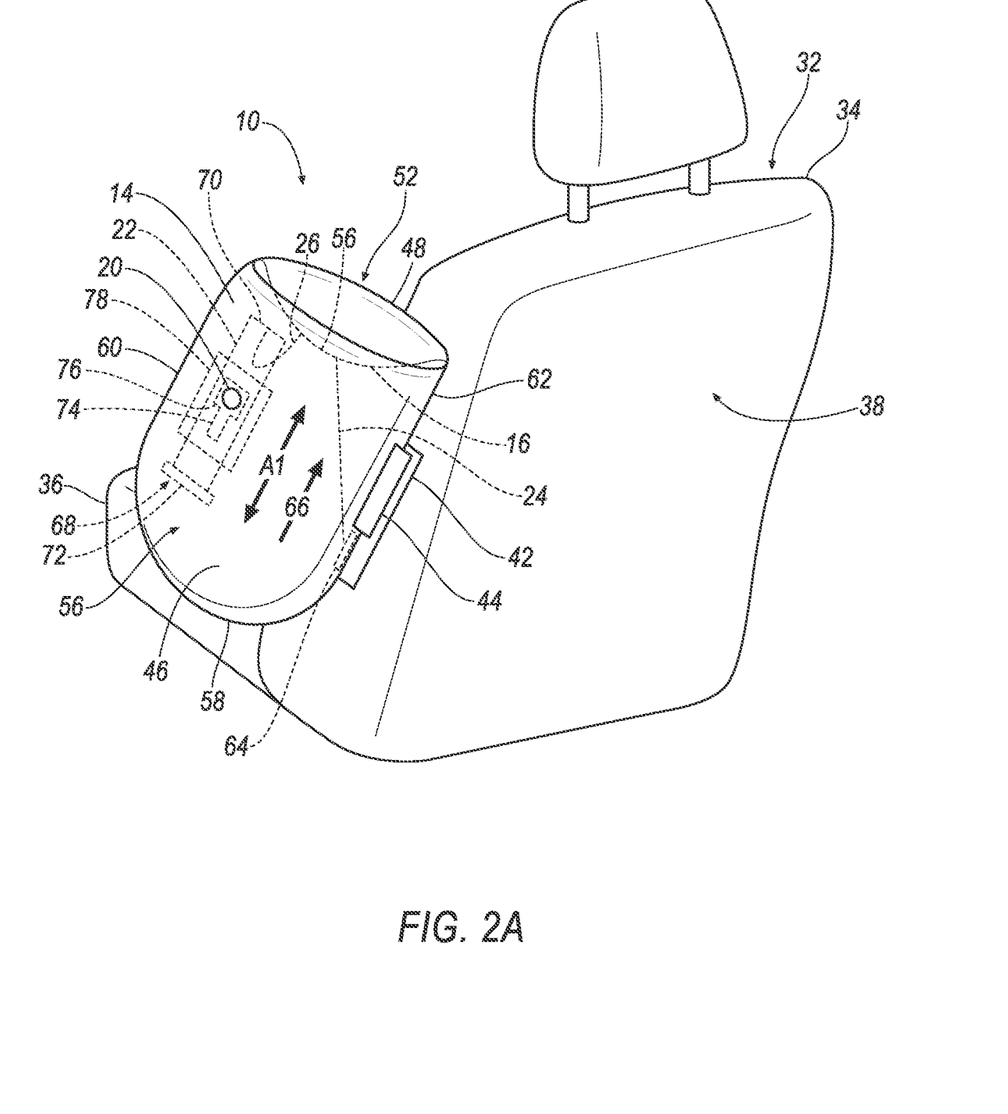
FIG. 2A is a perspective view of the side airbag in the inflated position and having a fold in an unreleased position.
Figure 2B:
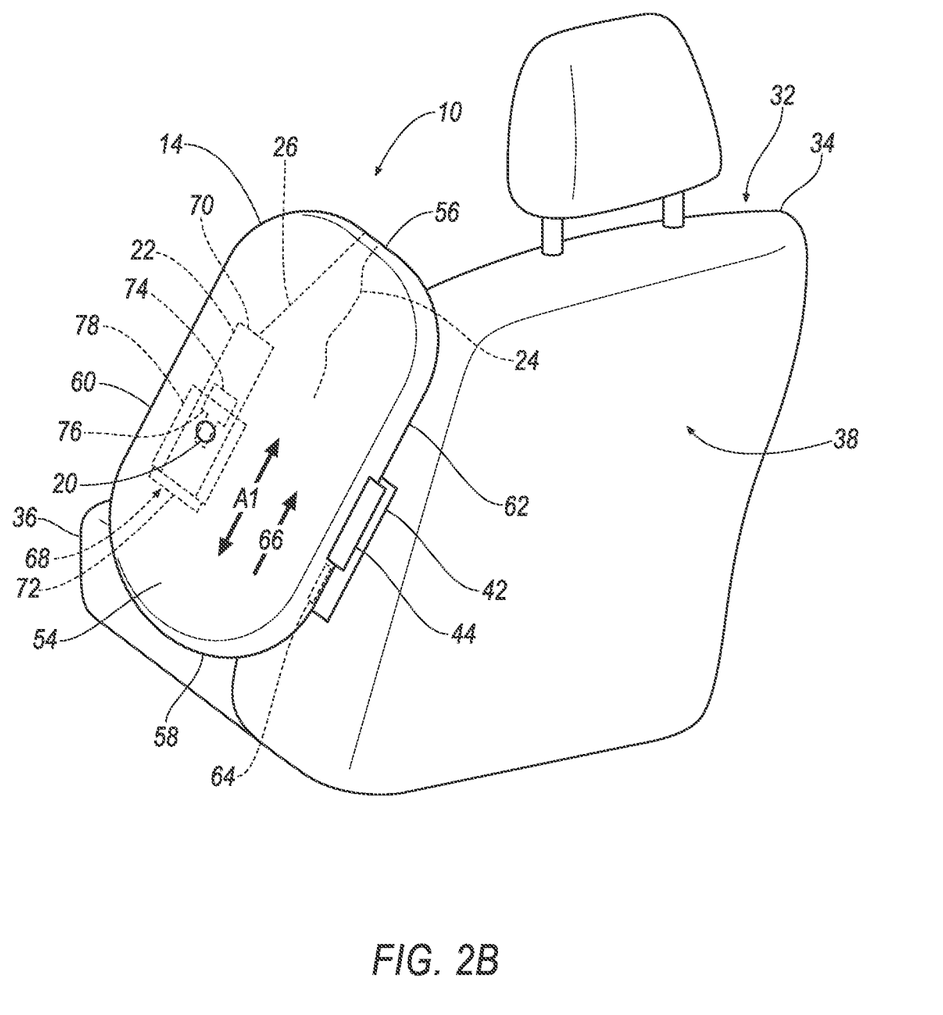
FIG. 2B is a perspective view of the side airbag in the inflated position with the fold in a released position.
Figure 3A:
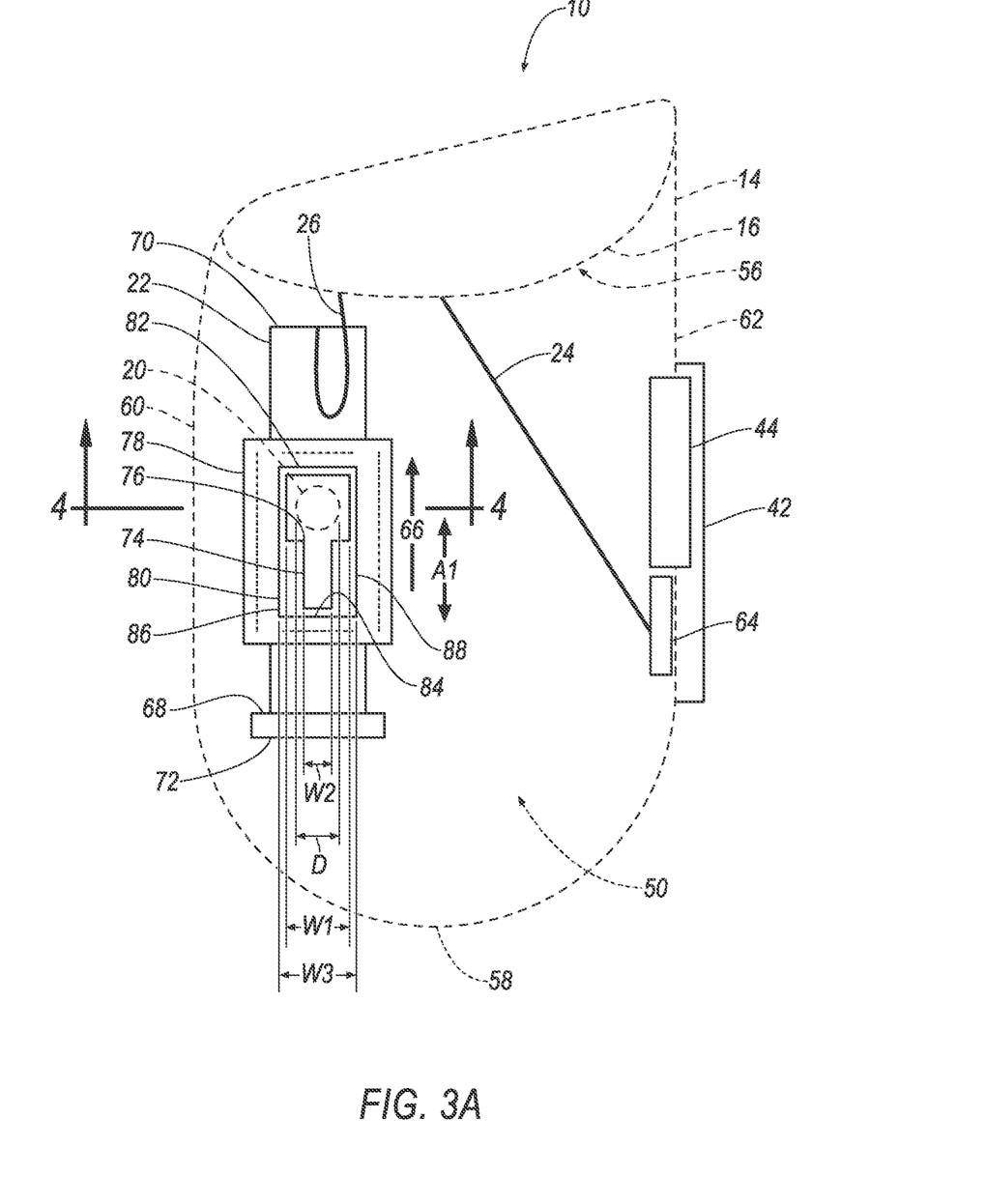
FIG. 3A is a side view of the side airbag assembly with the airbag in the inflated position and the fold in the unreleased position.
Figure 3B:
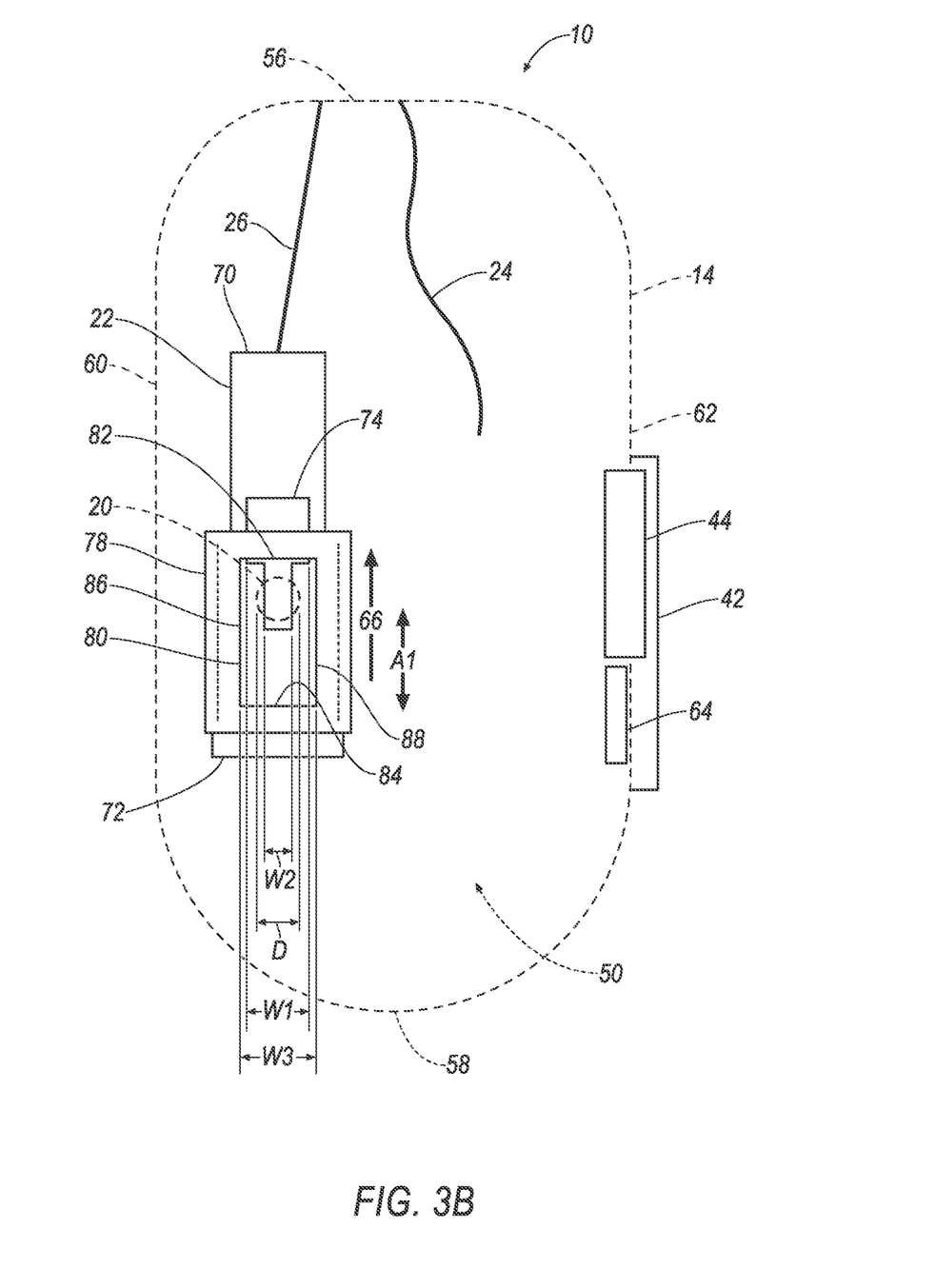
FIG. 3B is a side view of the side airbag assembly with the airbag in the inflated position and the fold in the released position.
Figure 4:
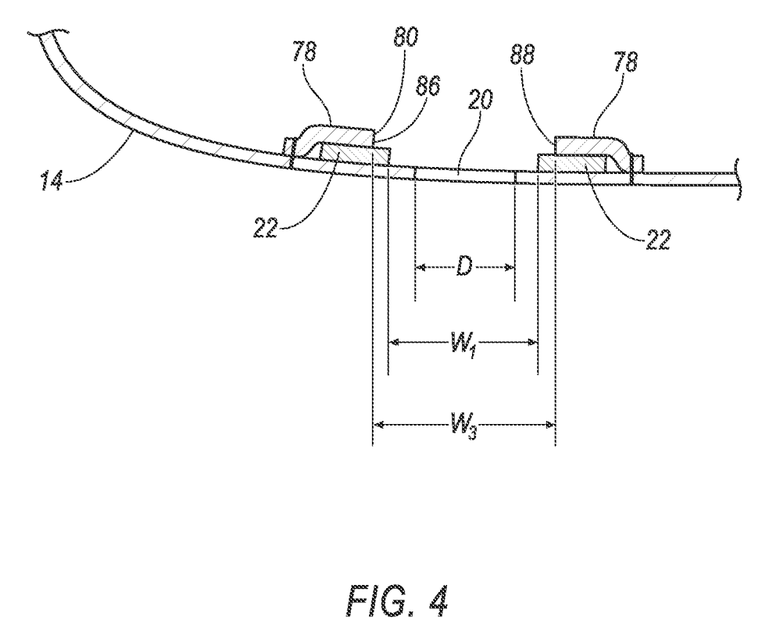
FIG. 4 is a cross-sectional view of the side airbag assembly along line 4 in FIG. 3A.

With reference to the Figures, wherein like numerals indicate parts throughout the several views, an assembly 10 for a vehicle 12 is generally shown. The assembly 10 is shown as a side airbag assembly 10 in the Figures. The side airbag assembly 10 includes an airbag 14 having a fold 16 releasable to a released position, as shown in FIGS. 2B and 3B. The airbag 14 includes a vent 20 20. The assembly 10 includes a vent cover 22 slidably supported by the airbag 14 and slidable relative to the vent 20. The assembly 10 includes a first tether 24 having one end connected to the fold 16 and another end connected to the airbag 14, and a second tether 26 connected to the fold 16 and to the vent cover 22.

Figure 1:
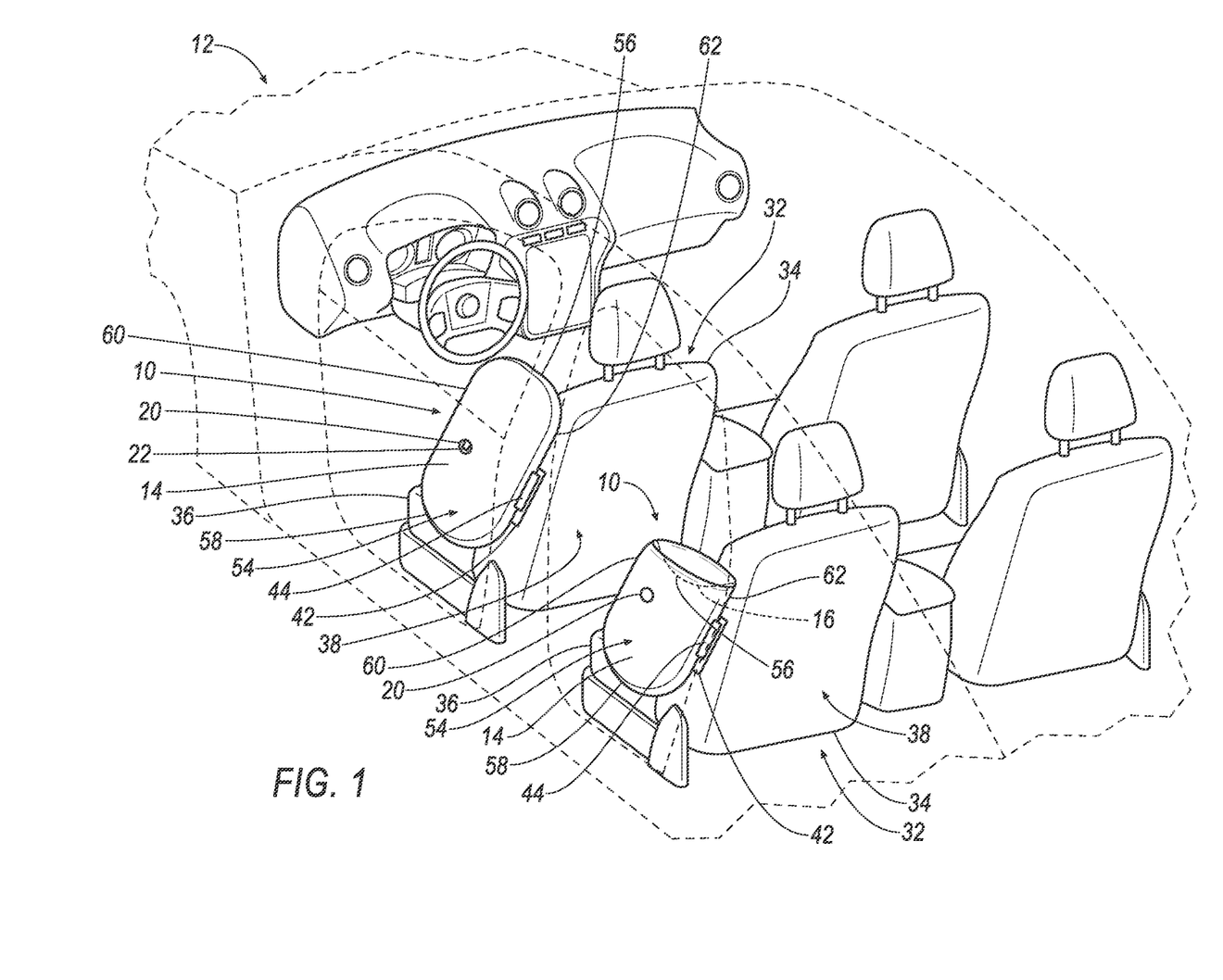
FIG. 1 is a perspective view of a vehicle including two side airbag assemblies with airbags in an inflated position.

The airbag 14 is inflatable to an inflated position to control the kinematics of the vehicle occupant in certain crashes. The fold 16 controls the size of the airbag 14 when the airbag 14 is in the inflated position. Specifically, when the airbag 14 is in the inflated position, the fold 16 may be in an unreleased position, as shown in FIGS. 1, 2A, and 3A, or may be in the released position. The airbag 14 has a larger size when the fold 16 is in the released position relative to the unreleased position. Specifically, the height and the volume of the airbag 14 is larger when the fold 16 is in the released position. The vent cover 22 controls the pressure and stiffness of the airbag 14. Specifically, the vent cover 22 slides relative to the vent 20 to alter venting characteristics of the airbag 14 as the fold 16 moves from the unreleased position to the released position.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 includes a seat. The seat 32 may include a seatback 34 and a seat bottom 36. The seatback 34 may be supported by the seat bottom 36 and may be stationary or movable relative to the seat bottom 36. The seatback 34 and the seat bottom 36 may be adjustable in multiple degrees of freedom. Specifically, the seatback 34 and the seat bottom 36 may themselves be adjustable, in other words, adjustable components within the seatback 34 and/or the seat bottom 36, and/or may be adjustable relative to each other.

The seatback 34 may include a seatback frame and a covering 38 supported by the seatback frame (not numbered). The seatback frame may include tubes, beams, etc. Specifically, the seatback frame includes a pair of upright frame members. The upright frame members are elongated, and specifically, are elongated in a generally upright direction when the seatback 34 is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc.

The covering 38 may include upholstery and padding. The upholstery may be cloth, leather, faux leather, or any other suitable material. The upholstery may be stitched in panels around the frame. The padding may be between the covering 38 and the seatback frame and may be foam or any other suitable material.

The seatback 34 may define an occupant seating area 40. The occupant may be disposed in the occupant seating area 40, as shown in the Figures. The occupant seating area 40 may be on a front side of the seatback 34. The airbag 14 may extend from the seatback 34 next to the occupant seating area 40 to control occupant kinematics.

The assembly 10 may be supported by the seatback 34. Specifically, in the examples shown in the Figures, the assembly 10 is a side airbag assembly 10 supported by the seatback 34. The assembly 10 may include a housing 42 that supports the airbag 14 on the seatback 34 when the airbag 14 is in the uninflated position and when the airbag 14 is in the inflated position. In such an example, the airbag 14 may be folded in the housing 42 when the airbag 14 is uninflated. The housing 42 may be mounted to the seatback frame, e.g., one of the upright frame members, and/or may be a component of the seatback frame. The housing 42 may be, for example, plastic. The assembly 10 may be concealed by the cover and may break through the tear seam as the airbag 14 inflates to the inflated position.

The assembly 10 may include an inflator 44. The inflator 44 is in fluid communication with the airbag 14. The inflator 44 expands the airbag 14 with inflation medium, such as a gas, to move the airbag 14 from the uninflated position to the inflated position. The inflator 44 may be supported by any suitable component. For example, the inflator 44 may be supported by the housing 42. The inflator 44 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag 14 is inflatable from the uninflated position (not shown) to the inflated position. In the inflated position, the airbag 14 controls the kinematics of the occupant in vehicle impacts that urge the occupant in a cross-vehicle direction, e.g., a near-side impact may urge the occupant toward the outboard side 54 of the vehicle 12.

The airbag 14 may include a first panel 46 and a second panel 48 which define an inflation chamber 50. The airbag 14 may have an inboard side 52 and an outboard side 54. One of the first panel 46 or the second panel 48 may be on the inboard side 52 of the airbag 14, and the other of the first panel 46 or the second panel 48 may be on the outboard side 54 of the airbag 14. In other embodiments not shown in the Figures, the airbag 14 may include additional panels, i.e., more than the first panel 46 and the second panel 48. As shown in the Figures, the vent cover 22, the first tether 24, the second tether 26, and the guide 78 are inside the inflation chamber 50.

The airbag 14 has a top side 56, a bottom side 58, a forward side 60, and a rearward side 62. One of the first panel 46 or the second panel 48 may be on the inboard side 52 of the airbag 14 and extend between the top side 56, the bottom side 58, the forward side 60, and the rearward side 62. The other of the first panel 46 or the second panel 48 may be on the outboard side 54 of the airbag 14 and extend between the top side 56, the bottom side 58, the forward side 60, and the rearward side 62. The inboard side 52 and the outboard side 54 may each extend to and terminate at the top side 56, the bottom side 58, the forward side 60, and the rearward side 62. The outboard side 54 faces a door and the inboard side 52 faces the occupant seating area 40 when the airbag 14 is in the inflated position. The inboard side 52 faces the occupant seating area 40 when the airbag 14 is in the inflated position.

The airbag 14 includes the fold 16. The fold 16 is releasable from the unreleased position to the released position. The fold 16 may be at the top of the airbag 14. Specifically, in the unreleased position, the fold 16 extends from the inboard side 52 to the outboard side 54 and from the forward side 60 to the rearward side 62. In the unreleased position the airbag 14 is folded into the inflation chamber 50, i.e., downwardly toward the bottom side 58. Specifically, as shown in FIG. 2A, the airbag 14 has a concave shape unreleased position. Thus the volume of the inflation chamber 50 is smaller in the unreleased position relative to the released position.

During deployment of the airbag 14, the fold 16 is selectively either maintained in the unreleased position or released to the released position based the size of the occupant in the seat. Specifically, the fold 16 is longer from the top side 56 to the bottom side 58 and the volume of the inflation chamber 50 is greater in the released position as compared to the unreleased position to control the kinematics of a larger occupant. The fold 16 in the unreleased position reduces the size of the airbag 14 to control the kinematics of a smaller occupant. As described further below, the vent cover 22 controls the pressure and stiffness of the airbag 14 to accommodate for the difference in the size of the inflation chamber 50 in the unreleased position and the released position.

The airbag 14 includes the vent 20. The vent 20 allows fluid communication between the inflation chamber 50 and the atmosphere. The vent 20 may be on the inboard side 52 or the outboard side 54 of the airbag 14. As shown in the Figures, the vent 20 is round. In this example, the vent 20 has a diameter D. The vent 20 may be of any suitable shape. In embodiments where the vent 20 is not round, the diameter D refers to the longest measurement of the vent 20 perpendicular to the axis A1 in the first direction 66, discussed below.

The airbag 14 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first tether 24 controls the position of the fold 16 and the second tether 26 controls the position of the vent cover 22. The release of the fold 16 is designed to operate the vent 20. As shown in FIGS. 2A and 3A, when the tether is in the unreleased position during inflation of the airbag 14, the vent cover 22 remains stationary relative to the airbag 14 and the vent 20 is unobstructed by the vent cover 22 so that the inflation chamber 50 vents through the vent 20. With reference to FIGS. 2B and 3B, when the first tether 24 is released during inflation of the airbag 14, the fold 16 moves from the unreleased position to the released position. When the fold 16 moves from the unreleased position to the released position, the second tether 26 pulls on the vent cover 22 to move the vent cover 22 relative to the airbag 14 so that the vent cover 22 partially restricts venting through the vent 20. The first tether 24 and the second tether 26 may be of any suitable material and may be of the same material or of a different material than the airbag 14.

The first tether 24 is connected to the fold 16. The first tether 24 may be directly or indirectly connected to the fold 16. In the example shown in the Figures, the first tether 24 is directly connected to the fold 16. The first tether 24 may be connected to the fold 16 by stitching, glue, ultrasonic welding, or other suitable method. In any event 20, the first tether 24 is connected to the fold 16 in any suitable fashion to selectively maintain the fold 16 in the unreleased position and release the fold 16 to the released position.

The first tether 24 is anchored relative to the airbag 14. In other words, the first tether 24 and the airbag 14 are anchored to a common feature or the first tether 24 is anchored to the airbag 14 itself. In the example shown in the Figures, the airbag 14 and the first tether 24 are both anchored to the housing 42. Specifically, the assembly 10 may include a pyrotechnic device 64, described further below, and the first tether 24 is anchored to the pyrotechnic device 64, which is anchored to the housing 42. In the example shown in the Figures, in the unreleased position the first tether 24 extends from the pyrotechnic device 64 to the fold 16. Specifically, the first tether 24 in the unreleased position, is designed to keep the top side 56 of the airbag 14 folded into the inflation chamber 50.

The first tether 24 is releasable to the released position by the pyrotechnic device 64. Specifically, the pyrotechnic device 64 is designed to release the first tether 24, and the released first tether 24 releases the fold 16 from the unreleased position to the released position. The pyrotechnic device 64 selectively maintains the first tether 24 anchored to maintain the first tether 24 in the unreleased position or releases the first tether 24 to release the first tether 24 to the released position. As shown in the Figures, the pyrotechnic device 64 may be anchored the housing 42 at the vehicle-rearward side 62 of the airbag 14. The pyrotechnic device 64 may be a cutter that cuts the first tether 24 to release the first tether 24. As another example, the pyrotechnic device 64 may include a releasable pin that releases the first tether 24 to the released position. Alternatively, the pyrotechnic device 64 may be of any suitable type. The pyrotechnic device 64 includes a pyrotechnic charge and an ignition. The ignition, in response to instructions from a computer 90 of the vehicle 12, ignites the charge to release the first tether 24. The pyrotechnic charge may be combustible to produce a gas. The pyrotechnic charge may be formed of a solid mixture of substances that, when ignited, react to produce the gas. For example, the pyrotechnic charge may be formed of sodium azide (NaN3), potassium nitrate (KNO3), and silicon dioxide (SiO2), which react to form nitrogen gas (N2).

The second tether 26 is connected to the fold 16 and the vent cover 22. Specifically, the second tether 26 may be directly connected to both the fold 16 and the vent cover 22, as shown in the Figures. The second tether 26 may be connected to the fold 16 and the vent cover 22 by stitching, glue, ultrasonic welding, or other suitable method.

The vent cover 22 is slidably supported by the airbag 14 and is slidable relative to the vent 20. Specifically, the vent cover 22 is slidable along an axis A1 in a first direction 66 as the fold 16 moves from the unreleased position to the released position. As shown in the Figures, the vent cover 22 is elongated along the axis A1 between a distal end 68 and a proximal end 70. Specifically, the second tether 26 may be connected to the fold 16 and to the proximal end 70. The distal end 68 is distal to the fold 16 relative to the proximal end 70, and the proximal end 70 is between the fold 16 and the distal end 68. The vent cover 22 may include a catch 72 at the distal end 68 to position the vent cover 22 when the fold 16 is in the released position, as described further below.

The vent cover 22 includes a hole 74 elongated on the axis A1. In the unreleased position and the released position the hole 74 is in communication with the vent 20, i.e., the hole 74 is aligned to allow fluid communication between the inflation chamber 50 and the atmosphere. The hole 74 has a width perpendicular to the axis A1. The hole 74 may vary in width between the distal and proximal ends. As shown in the Figures, the width of the hole 74 increases along the first direction 66, i.e., from the distal end 68 to the proximal end 70.

As one example, the hole 74 may include a step change 76 between two widths. Specifically, the hole 74 may have a first width W1 and a second width W2 with a step change 76 between the first width W1 and the second width W2. The first width W1 and the second width W2 are perpendicular to the axis A1. As shown in the Figures, the first width W1 is between the proximal end 70 and the second width W2. The second width W2 is less than the first width W1. When the fold 16 is in the unreleased position the first width W1 is in communication with the vent 20 and when the fold 16 is in the released position the second width W2 is in communication with the vent 20. As shown in the Figures, the first width W1 may be larger than the diameter D of the vent 20 and the second width W2 may be smaller than the diameter D. Specifically, the second width W2 restricts the flow of the inflation gas between the inflation chamber 50 and the atmosphere more than the first width W1.

The assembly 10 may include the guide 78 fixed to the airbag 14. The vent cover 22 is slidably engaged with the guide 78. The guide 78 is between the distal end 68 of the vent cover 22 and the fold 16. Specifically, the guide 78 is between the distal end 68 and the proximal end 70 of the vent cover 22. As shown in the Figures, the guide 78 is separate from the vent cover 22 and connected to the vent cover 22. The vent cover 22 is disposed between the guide 78 and the airbag 14. Specifically, the vent cover 22 is slidable in the first direction 66 between the guide 78 and the airbag 14.

As shown in the Figures, the guide 78 is planar, i.e., the guide 78 is fixed to the first panel 46 or the second panel 48. The guide 78 may be flexible, i.e., the guide 78 may follow the contours of the airbag 14. The guide 78 has an opening 80 having a top edge 82, a bottom edge 84, a vehicle-forward edge 86, and a vehicle-rearward edge 88. The opening 80 has a width W3 larger than the first width W1 of the vent cover 22, i.e., the opening 80 between the vehicle-forward edge 86 and the vehicle-rearward edge 88 does not obstruct the opening 80 of the vent cover 22. The guide 78 is fixed to the airbag 14 in the first direction 66 adjacent the vehicle-forward edge 86 and the vehicle-rearward edge 88 of the opening 80. The guide 78 may be fixed to the airbag 14 by stitching, glue, ultrasonic welding, or other suitable method.

As shown in the Figures, in the unreleased position the vent cover 22 is releasably fixed to the guide 78 adjacent the top edge 82 and the bottom edge 84. When the second tether 26 pulls the vent cover 22, the vent cover 22 is released from the guide 78. The vent cover 22 may be releasably fixed to the guide 78 by any suitable means, e.g., stitching, glue, ultrasonic welding, etc.

The vent cover 22 may include the catch 72. As shown in the Figures, the catch 72 may be at the distal end 68 of the vent cover 22. The catch 72 is designed to engage with the guide 78 when the fold 16 moves from the unreleased position to the released position. Specifically, the catch 72 limits movement of the vent cover 22 in the first direction 66, i.e., the vent cover 22 moves freely in the first direction 66 until the catch 72 engages the guide 78.

As shown in the Figures, the catch 72 is larger than the opening 80 between the bottom outer edge of the guide 78 and the airbag 14, i.e., the catch 72 cannot slide through the guide 78. In other embodiments that catch 72 may be of any suitable shape or construction such as a hook. The catch 72 may be of the same material as the vent cover 22 or may be of different material.

In operation, the airbag 14 is inflated in response to a sensed vehicle impact. As set forth above, in the inflated position, the airbag 14 is positioned to control the kinematics of the vehicle occupant. During deployment of the airbag 14, the fold 16 is selectively either maintained in the unreleased position or released to the released position based the size of the occupant in the seat. Upon impact, the first tether 24 is released for a larger occupant and the fold 16 is released upwardly toward the roof of the vehicle 12. Specifically, the airbag 14 is shorter from the top side 56 to the bottom side 58 and the volume of the inflation changer is smaller in the unreleased position as compared to the released position to control the kinematics of a smaller occupant. The first tether 24 remains in the unreleased position when the occupant in the seat 32 is small. Accordingly, the vent cover 22 remains in position relative to the vent 20 to control the venting through the vent 20. The airbag 14 is longer from the top side 56 to the bottom side 58 and the volume of the inflation chamber 50 is greater in the released position as compared to the unreleased position to control the kinematics of a larger occupant. When the first tether 24 is released, the second tether 26 is pulled taught, releases the vent cover 22 from the guide 78, and pulls the vent cover 22 in the first direction 66. Specifically, the vent cover 22 slides relative to the vent 20 to alter venting characteristics of the airbag 14 as the fold 16 moves from the unreleased position to the released position. The vent cover 22 controls the pressure and stiffness of the airbag 14 to accommodate for the difference in the size of the inflation chamber 50 in the unreleased position and the released position.

The vehicle 12 includes a computer 90 and a communications network 92. The computer 90 may be a microprocessor-based controller. The computer 90 may include a processor, memory, etc. The memory of the computer 90 may store instructions executable by the processor as well as data and/or databases. The computer 90 is programmed to perform the method shown in FIG. 6, i.e., the memory stores instructions executable by the processor to perform the elements of the method shown in FIG. 6.

The vehicle 12 may include at least one impact sensor 94 in communication with the computer 90. The impact sensor 94 is designed to detect an impact to the vehicle 12. The inflator 44 may be activated based on detected impact. The impact sensor 94 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 94 may be located at numerous points in or on the vehicle 12. In the event 20 of an impact, the impact sensor 94 may detect the impact and transmit a signal through the communications network 92 to the computer 90.

The vehicle 12 may include at least one occupant size sensor 96 in communication with the pyrotechnic device 64. The occupant size sensor 96 is designed to detect the size of the occupant in the occupant seating area 40. The computer 90 may activate the pyrotechnic device 64 in response to detected impact and detected occupant size. As an example, the occupant size sensor 96 may be a weight sensor in the seat; a camera in the passenger cabin for detecting the size and shape of the occupant; a sensor in the seatbelt that detects the amount of seatbelt webbing extended from the seatbelt retractor, etc. The size of the occupant may be classified based on anthropomorphic size identified in regional regulations. Such a classification may be used to determine whether the occupant is above or below a size threshold at which the first tether 24 is released.

Figure 5:
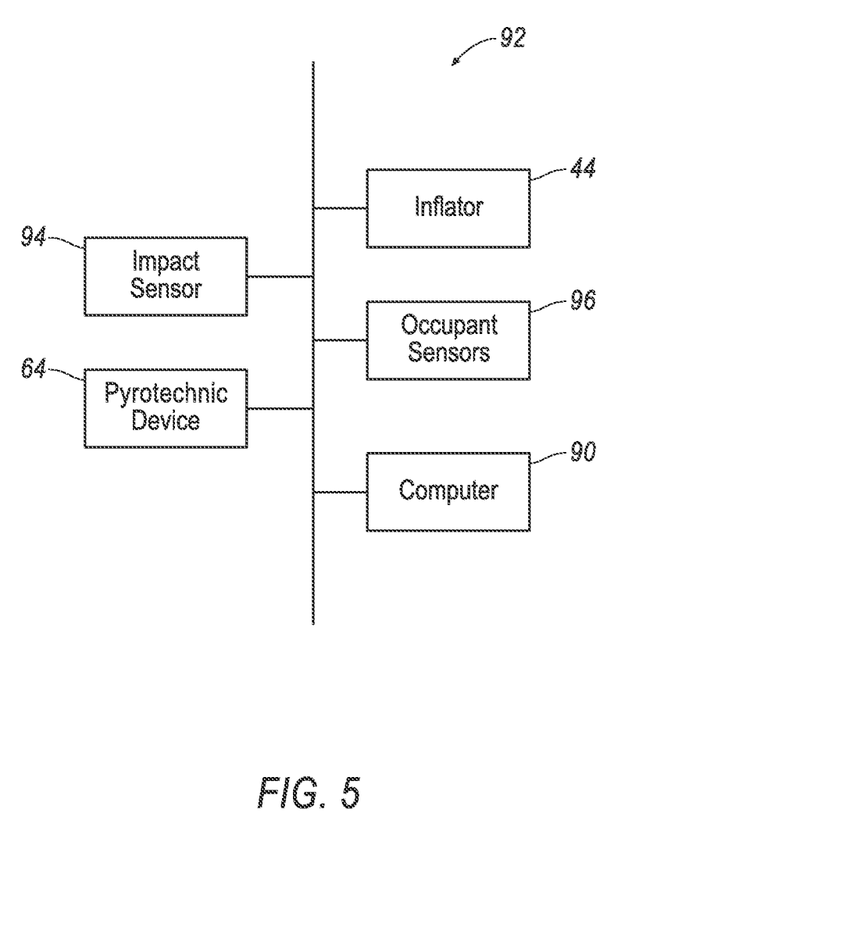
FIG. 5 is a block diagram of a communications network.

With reference to FIG. 5, the vehicle 12 may include a control system including the communications network 92 and the computer 90, e.g., an airbag control module. The communications network 92 may be a controller area network (CAN) bus, ethernet, wi-fi, local interconnect network (LIN), and/or by any other wired or wireless communications network 92. The computer 90 may be in communication with the impact sensor 94, the occupant size sensor 96, the inflator 44, and the pyrotechnic device 64 via the communications network 92.

The computer 90 is programmed to initiate inflation of the airbag 14 and to control the pyrotechnic device 64 to selectively maintain the first tether 24 in the unreleased position or to release the first tether 24 to the released position.

Figure 6:
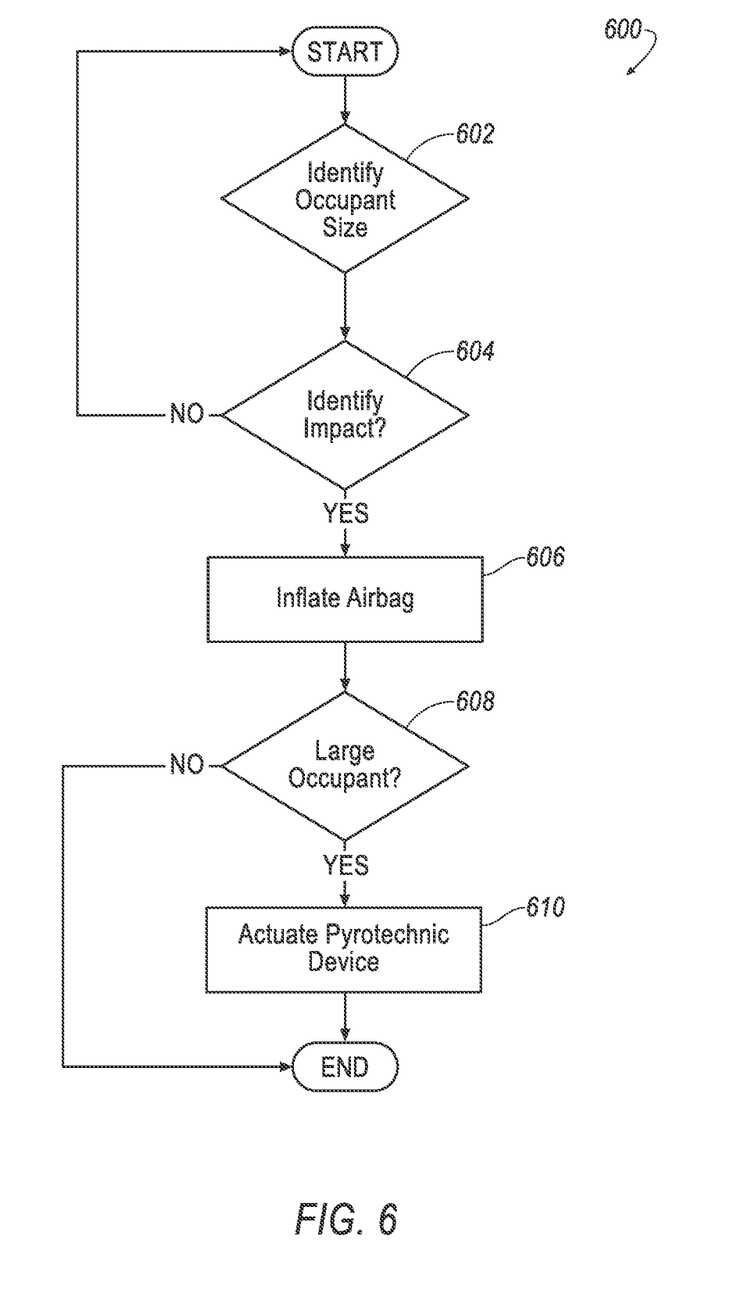
FIG. 6 is a block diagram showing a method performed by a computer of the vehicle.

For example, the computer 90 may be programmed to first determine occupant size in the occupant seating area 40, as shown in block 602. Specifically, the computer 90 may determine whether the occupant in the seat 32 is above or below the size threshold based on input from the occupant size sensor 96. The decision in block 602 may be repeated periodically or may be repeated when a new occupant is sensed.

When an impact is detected, as shown in block 604, the computer 90 instructs the inflator 44 to inflate the airbag 14 in response to the impact, as shown in block 606.

As shown in block 608, the computer 90 selectively maintains the first tether 24 in the unreleased position or releases the first tether 24 to the released position based on the inflation of the airbag 14 and the identification of the size of the occupant. Specifically, if the occupant is identified as a large occupant, the computer 90 instructs the actuation of the pyrotechnic device 64 to release the first tether 24 to the released position, as shown in block 610. If the occupant is identified as a small occupant, the computer 90 does not instruct the actuation of the pyrotechnic device 64 and the first tether 24 remains in the unreleased position.

Computing devices, such as the computer 90, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by the computer 90 (e.g., by a processor of the computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of hole 74, a RAM, a PROM, an EPROM, a FLASH-EEPROM, any other memory chip or cartridge, or any other medium from which the computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
an airbag including a fold releasable to a released position;
the airbag including a vent;
a vent cover slidably supported by the airbag and slidable relative to the vent;
a first tether having an end connected to the fold and another end releasably anchored to the airbag; and
a second tether connected to the fold and to the vent cover.

2. The assembly of claim 1, further comprising a pyrotechnic device, the first tether releasable by the pyrotechnic device.

3. The assembly of claim 1, wherein the vent cover includes a hole in communication with the vent.

4. The assembly of claim 3, wherein the vent cover is slidable relative to the airbag along an axis, and the hole is elongated along the axis and varies in width perpendicular to the axis.

5. The assembly of claim 4, wherein the vent cover is slidable along the axis in a first direction as the fold moves toward the released position, the width of the hole increases along the first direction.

6. The assembly of claim 3, wherein the vent cover is slidable relative to the airbag along an axis when the fold moves from an unreleased position to the released position, and the hole has a first width in communication with the vent when the fold is in the unreleased position and a second width in communication with the vent when the fold is in the released position, the second width being less than the first width.

7. The assembly of claim 6, wherein the vent has a width, the second width of the hole being smaller than the width of the vent, the first width being larger than the width of the vent.

8. The assembly of claim 1, wherein the airbag includes an inflation chamber and the vent cover, the first tether, and the second tether are in the inflation chamber.

9. The assembly of claim 1, further comprising a guide fixed to the airbag, the vent cover being slidably engaged with the guide.

10. The assembly of claim 9, wherein the vent cover is disposed between the guide and the airbag.

11. The assembly of claim 9, wherein the vent cover includes a catch designed to engage the guide when the fold is in the released position.

12. The assembly of claim 11, wherein the vent cover is slidable relative to the airbag along an axis when the fold moves from an unreleased position to the released position, the vent cover includes a hole having a first width in communication with the vent when the fold is in the unreleased position and a second width in communication with the vent when the fold is in the released position, the second width being less than the first width.

13. The assembly of claim 11, wherein the vent cover includes a distal end distal to the fold, the guide is between the distal end and the fold, and the catch is at the distal end of the vent cover.

14. The assembly of claim 9, wherein the vent cover is releasably fixed to the guide.

15. The assembly of claim 1, wherein the airbag has a top and a bottom and wherein the fold is at the top of the airbag.

16. The assembly of claim 1, further comprising a seat including a seatback, the airbag supported by the seatback.

* * * * *